United States Patent [19]

Sugiura

[11] Patent Number: 5,103,335
[45] Date of Patent: Apr. 7, 1992

[54] MOTOR DEVICE HAVING A DYNAMIC-PRESSURE FLUID BEARING

[75] Inventor: Yoshinori Sugiura, Kawasaki, Japan

[73] Assignee: Canon Kabushiki Kaisha, Tokyo, Japan

[21] Appl. No.: 527,447

[22] Filed: May 23, 1990

[30] Foreign Application Priority Data

May 23, 1989 [JP] Japan .................. 1-127887

[51] Int. Cl.⁵ ............................................ G02B 26/08
[52] U.S. Cl. ..................... 359/212; 359/217; 310/90; 73/497
[58] Field of Search ............... 350/6.5, 6.7, 6.8; 310/90, 90.5; 384/99, 100, 113, 114; 73/497

[56] References Cited

U.S. PATENT DOCUMENTS

| | | |
|---|---|---|
| 3,782,205 | 1/1974 | Fletcher et al. ............... 73/497 |
| 3,992,576 | 11/1976 | Sugiura . |
| 4,099,415 | 7/1978 | Hartzell, Jr. .................. 73/497 |
| 4,609,251 | 9/1986 | Nakaoka et al. ............... 350/6.8 |
| 4,623,216 | 11/1986 | Sato et al. ..................... 350/6.8 |
| 4,694,213 | 9/1987 | Gowda et al. .................. 310/90 |

Primary Examiner—Loha Ben
Attorney, Agent, or Firm—Fitzpatrick, Cella, Harper & Scinto

[57] ABSTRACT

A motor includes a rotating mirror for reflecting and performing deflection scanning of a light beam emitted from a light source, a support member for supporting the rotating mirror, a fixed member for supporting the support member, a fluid disposed between the support member and the fixed member, a driving magnet provided on a rotor fixed to the support member, a driving coil fixed at a position on a body portion of the motor facing the driving magnet, and a heater for heating the fluid.

7 Claims, 3 Drawing Sheets

MOTOR DEVICE HAVING A DYNAMIC-PRESSURE FLUID BEARING

BACKGROUND OF THE INVENTION

1. Field of the Invention

This invention relates to a motor device having a dynamic-pressure fluid bearing, and more particularly, to the temperature control of the bearing.

2. Description of the Related Art

A deflection scanning device provided, for example, in a laser-beam printer or the like includes a rotating mirror for reflecting a light beam emitted from a light source. Initially, the bearing used for receiving a rotating shaft supporting the rotating mirror was a ball-bearing-type bearing. However, a ball bearing not only has difficulty in rotating at high speed due to the generation of vibration and noise, but also exhibits a backlash between the balls of the bearing and the inner and outer rings supporting the balls; in addition, a mirror surface of the rotating mirror tilts, that is, a so-called tilt of the surface occurs. In order to solve such problems, dynamic-pressure fluid bearings have been developed.

FIG. 6 shows a cross section of a motor for deflection scanning using such a dynamic-pressure fluid bearing. In FIG. 6, a rotating polygon mirror 1, which is a kind of rotating mirror, is mounted on a rotor 2, having the shape of a sleeve and having a cavity in its center, by a mounting flange 3. A driving magnet 4 is fixed to the rotor 2, and is rotatably driven by a stator coil 5, which is a driving coil provided around the circumference of the driving magnet 4 facing it. On an apex portion of the rotor 2, there is provided a thrust plate 6 for generating thrust pressure for an apex portion of a fixed shaft, which will be described later. A fine hole 7 is perforated in the center of the thrust plate 6.

On the other hand, a fixed shaft 8 is inserted within the cavity of the rotor 2, and dynamic-pressure generation grooves 9 are formed on the outer circumference of the fixed shaft 8. The fixed shaft 8 is fixed to a cup-like motor case 10. A cap 10a is fitted to an upper opening end of the motor case 10, and seals up the inside of the deflection scanning motor.

Heretofore, the fluid used in such a dynamic-pressure fluid bearing is a gas, such as air or the like. That is, such a dynamic-pressure fluid bearing has been developed for the purpose of being used at a relatively high number of revolutions of 10,000 rpm or more, and a dynamic-pressure fluid bearing using a gas is suitable for this purpose. However, a dynamic-pressure fluid bearing using gas, such as air or the like as a fluid has disadvantages; these include difficulty in obtaining high precision in the processing of a bearing portion of the motor, and permitting the introduction of dust in the motor, which, even in small amounts, is not allowed.

In order to solve these problems, dynamic-pressure fluid bearings using oil as a fluid have been developed. The oil dynamic-pressure fluid bearings are mostly used as bearings of cylinder heads of VCR's (video cassette recorders) or bearings for turntables of record players, and have been used in fields requiring a relatively small number of revolutions per minute.

SUMMARY OF THE INVENTION

Generally speaking, the disadvantage in an oil dynamic-pressure fluid bearing is that the viscosity of the oil changes with temperature. This is not a serious disadvantage when the number of revolutions is small. However, when an oil dynamic-pressure fluid bearing is used as a bearing for a device which rotates at a high speed of about 10,000 rpm, such as a deflection scanning device, there arise various disavantages: the number of revolutions per minute does not reach a target value; the current consumption of the motor substantially increases to heat the motor to an abnormal degree; and the motor revolves unevenly, which is fatal for a motor for a deflection scanning device.

The present invention has been made in consideration of the problems as described above.

It is an object of the present invention to provide a motor device having a dynamic-pressure fluid bearing which can stably rotate at a high speed even if the temperature of an environment in which the device is used changes, and to provide a motor which is not heated to an abnormal degree, and which suppresses uneven rotation of its parts.

According to one aspect, the present invention relates to a scanning motor comprising a rotating mirror for reflecting a light beam emitted from a light source, a first support member for supporting the rotating mirror, a second support member for rotatably supporting the first support member, a fluid disposed between the first support member and the second support member, a rotor fixed to the first support member, a driving magnet provided on the rotor, a driving coil fixed at a position on the motor facing the driving magnet, and heating means for heating the fluid.

According to another aspect, the present invention relates to a motor comprising a first support member, a second support member for rotatably supporting the first support member, a fluid disposed between the first support member and the second support member, a rotor fixed to the first support member, a driving magnet provided on the rotor, a driving coil fixed at a position on the motor facing the driving magnet, and control means for controlling the supply of current to the driving coil in order to control the temperature of the fluid. Also provided is a temperature detector provided near the first or second support members. In addition, the control means controls the supply of current to the driving coil during the cessation of deflection scanning of a rotating mirror supported by the first support member according to an output signal from the temperature detector.

By heating the fluid with the heating means, the viscosity of the fluid can always be maintained low. Furthermore, by supplying current for the driving magnet during the cessation of deflection scanning, the fluid can be heated without providing a separate heating means, and the viscosity of the fluid can always be maintained low.

By thus always maintaining the viscosity of the fluid to be low, high-speed revolution becomes possible, and it is possible to prevent the motor from being heated to an abnormal degree, and to prevent the occurrence of uneven rotation of the parts of the motor due to a large viscosity of the fluid.

DETAILED DESCRIPTION OF THE PREFERRED EMBODIMENTS

Figure 1:
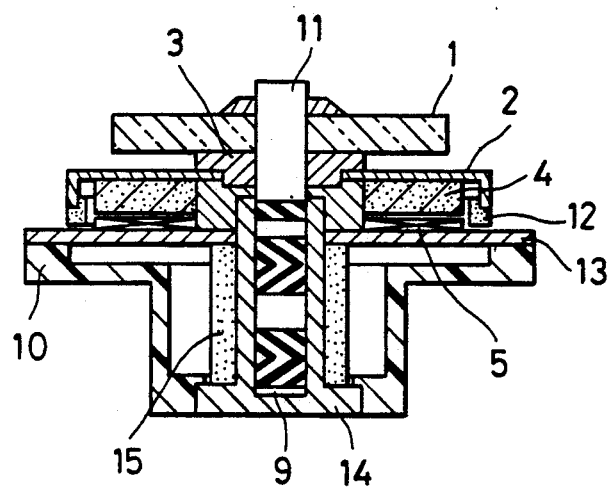
FIG. 1 is a cross-sectional view of a motor device according to an embodiment of the present invention.

FIG. 1 shows a first embodiment of the present invention. In FIG. 1, a rotating polygon mirror 1, serving as a rotating mirror, reflects a light beam emitted from a light source (not shown), and rotates. By performing deflection scanning of the light beam by the rotation, and by projecting the light beam, for example, a laser beam, upon the surface of a photosensitive drum (not shown), it is possible to form an electrostatic latent image on the surface of the photosensitive drum. The rotating polygon mirror 1 is supported on a rotating shaft (support member) 11 by a mounting flange 3. The mounting flange 3 is fixed to the rotating shaft 11 by a press fit or a shrink fit. A short cylindrical rotor 2 is coaxially fixed to the mounting flange 3, and a driving magnet 4 and a magnet 12 are provided inside the rotor 2. A stator coil 5, serving as a driving coil, and a printed circuit board 13 having a pattern printed thereon are fixed to the main body of the motor at positions facing the driving magnet 4 and the magnet 12, respectively. Current supply for the stator coil 5, which is disposed above the printed circuit board 13, is controlled by Hall elements (not shown) and a drive circuit and a control circuit formed on the printed circuit board 13. Dynamic-pressure generation grooves 9 are formed on the outer circumferential surface of the rotating shaft 11, which is inserted and received in a bearing sleeve (fixed member) 14. The bearing sleeve 14 has an opening at its upper portion, in which the rotating shaft 11 is inserted, and in which oil, serving as a fluid, is poured. The lower end of the bearing sleeve 14 is fixed to a motor case 10 in a manner forming one body.

A heating member 15, serving as a heating means, is mounted on the printed circuit board 13 so as to be situated around the outer circumference of the bearing sleeve 14. The heating member 15 comprises a self-regulating temperature control element, such as a positive-temperature-coefficient thermistor or the like, and has a capability of controlling and maintaining itself at a constant temperature irrespective of the surrounding temperature via the current supplied therethrough. The motor case 10, which exists outside the heating member 15, is formed by a resin having good heat-insulating properties so that heat from the heating member 15 does not escape outside the motor.

The functions of the present embodiment will now be explained. When a switch of a power supply of an apparatus on which the deflection scanning motor is mounted, for example, a laser-beam printer, is switched on, current is supplied to the heating member 15, which is maintained at a constant temperature. The bearing sleeve 14 is thereby heated, and the viscosity of the oil, which is the fluid contained therein, is always maintained low. Accordingly, it is possible to remove the conventional disadvantage that, when the laser-beam printer, on which the deflection scanning motor of the present embodiment is mounted, is in a standby state, for example in a very cold place, the viscosity of the oil increases due to the low temperature, thereby rendering the driving torque to be transmitted from the rotating shaft 11 to the rotating polygon mirror 1 insufficient to rotate the polygon mirror 1 to reach a target speed. Furthermore, this control of the viscosity of the oil can prevent a change in the amount of the gap between the rotating shaft 11 and the bearing sleeve 14 due to a change in temperature, and hence provides a motor having stable and constant dynamic characteristics. By thus heating a bearing portion to maintain it at a constant temperature, it becomes possible to provide a deflection scanning motor having a stable performance not influenced by environmental temperature.

Figure 2:
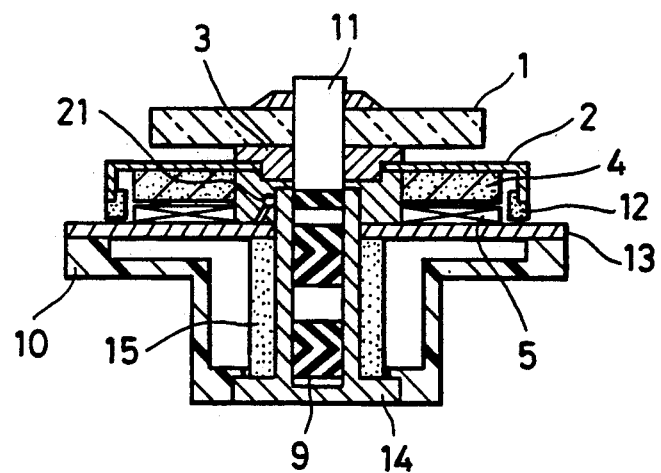
FIG. 2 is a cross-sectional view of a motor device according to a further embodiment of the present invention.

In the first embodiment, the heating member, serving as the heating means, is a self-regulating temperature control element, and has a capability of controlling and maintaining itself at a constant temperature only by the current supply through it. In another embodiment, however, the heating member itself may not have a temperature control capability, but may be controlled at a constant temperature by a temperature control circuit. This second embodiment is shown in FIG. 2. Components which are identical to those in FIG. 1 showing the first embodiment are indicated by identical numerals, and an explanation thereof will be omitted. A temperature detector 21 is mounted on the bearing sleeve 14, and is connected to the printed circuit board 13. The heating member 15 is provided on the opposite surface of the printed circuit board 13, and is connected to the printed circuit board 13. An output signal from the temperature detector 21 is transmitted to a temperature control circuit (not shown) via the printed circuit board 13 to control the current supply for the heating member 15. When the output signal from the temperature detector 21 does not reach a predetermined value, the temperature control circuit operates so that current is supplied to the heating member 15 and the printed circuit board 13 stops the revolution of the motor until the output signal of the temperature detector 21 reaches the predetermined value. When the output signal reaches or exceeds the predetermined value, the temperature control circuit operates so that current supply for the heating member 15 is interrupted. It is thereby possible to prevent insufficient lubrication due to an increase in the viscosity of the oil at low temperatures. In a dynamic-pressure fluid bearing using oil, if insufficient lubrication from the oil occurs, the bearing wears out due to solid contact, and the bearing is damaged. The worn out or damaged bearing does not have predetermined revolution characteristics, and therefore causes uneven revolutions or inferior starting. The damage to the bearing can be prevented by stopping the revolution of the motor if the temperature of the bearing is too low when the lubrication of the oil is insufficient. When the temperature of the heating member is too high, since the viscosity of the oil becomes too low, the oil disperses during the revolution of the motor, and the bearing spacing becomes larger than a predetermined value, causing a deterioration in the dynamic characteristics of the bearing. Accordingly, in order to obtain a stable performance, it is necessary to maintain the heating member at a constant temperature.

Figure 3:
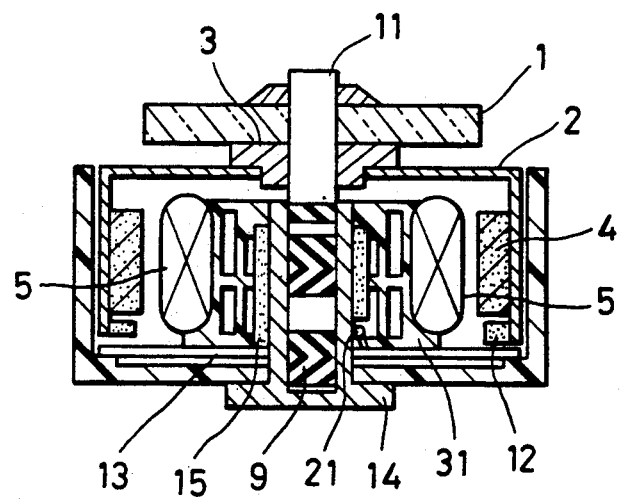
FIG. 3 is a cross-sectional view of a motor device according to a still further embodiment of the present invention.

In the above-described first and second embodiments, an explanation has been provided of the motor in which the driving magnet 4 and the stator coil 5 are provided at the same distance in the direction of the radius from the rotating shaft 11. However, the present invention may also be applied to an outer-rotor-type motor in which the driving magnet 4 is situated outside the stator coil 5 as in a third embodiment of the present invention shown in FIG. 3. In FIG. 3, components having identical functions as those shown in FIG. 1 are indicated by identical numerals, and an explanation thereof will be omitted. The heating member 15 provided around the outer circumference of the bearing sleeve 14, and the stator coil 5 are held by a holder 31 made of a molded resin having good heat-insulating properties, and are connected and fixed to the printed circuit board 13. A thermistor, serving as the temperature detector 21, is mounted on the bearing sleeve 14, and is connected to the printed circuit board 13. The temperature detector 21 can thereby detect the temperature within the motor to control the current supply for the heating member 15. A motor control circuit, a drive circuit, a temperature detection circuit, and a heating-member control circuit are printed on the printed circuit board 13. According to these circuits, the stator coil 5, the heating member 15 and the thermistor, serving as the temperature detector 21, function as one unit. Such an approach for providing a unit may also be adopted in the inner-rotor-type motors shown in FIGS. 1 and 2.

As described above, the heating member 15 of the present invention may comprise a self-regulating temperature control element, such as a positive-temperature-coefficient thermistor or the like, or may comprise another heating member, for example, a commonly-used nichrome-wire heater. That is, if a self-regulating temperature control element, such as a positive-temperature-coefficient thermistor or the like, is used, a control circuit for controlling temperature is unnecessary. If temperature control having higher accuracy is needed, it becomes necessary to control the current supply for the heating member by a control circuit. As shown in the third embodiment, by covering the outer circumference of the bearing sleeve 14 with the resin-molded holder 31, the heat-insulating effect is increased. It becomes thereby possible to maintain the temperature of the bearing with a small amount of electric power, and the influence of the environmental temperature becomes smaller. Hence, a motor having small temperature variation becomes possible.

Figure 4:
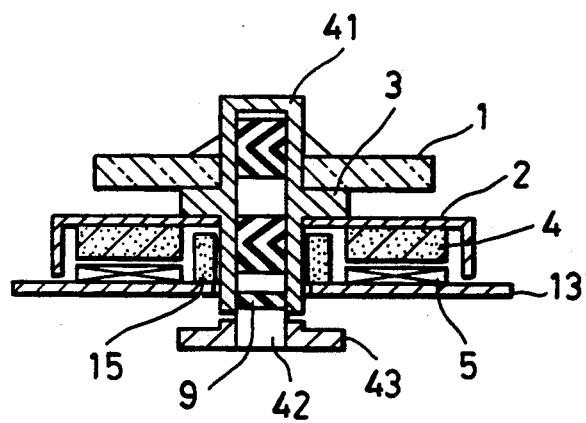
FIG. 4 is a cross-sectional view of a motor device according to still another embodiment of the present invention.

In the above-described embodiments, an explanation has been provided of a deflection scanning motor having a structure in which the rotating shaft 11 supporting the rotating mirror is received in the bearing sleeve 14. However, the present invention may also be applied to a deflection scanning motor having a structure in which a rotating mirror is supported by a rotating sleeve (support member) 41, which is supported by a fixed shaft 42, as in a fourth embodiment shown in FIG. 4. That is, the rotating polygon mirror 1 is fixed and supported on the upper surface of a mounting flange 3 of the rotating sleeve 41. A rotor 2 is fixed to the opposite surface of the mounting flange 3, and a driving magnet 4 is provided inside the rotor 2. The fixed shaft (fixed member) 42 is inserted in the rotating sleeve 41, and oil, serving as a fluid, fills in a gap between the fixed shaft 42 and the rotating sleeve 41. The fixed shaft 42 is pressed in a support flange 43 of the main body of the motor. A stator coil 5 is disposed above a printed circuit board 13 facing the driving magnet 4. A hole for receiving the rotating sleeve 41 is provided in a central portion of the printed circuit board 13. A ring-like heating member 15 is disposed around the hole and above the surface of the printed circuit board 13. The heating member 15 comprises a self-regulating temperature control element, which always controls itself at a constant temperature, and maintains a small gap with the rotating sleeve 41. The rotating sleeve 41 in rotation can also be heated by the heating member 15 because of this small gap, and the viscosity of the oil, serving as the fluid, filled between the rotating sleeve 41 and the fixed shaft 42 can be maintained low.

In the above-described embodiments, the heating means, such as the heating member or the like, has been provided for heating the fluid. However, in the case of a brushless motor which drives a plurality of stator driving coils 5 by a driver integrated circuit (IC) 51 by detecting a rotation phase by Hall elements (not shown), as in an embodiment of the present invention shown in FIG. 5, the stator driving coils 5 may be heated by passing current through the stator driving coils 5 without using a separate heating means, and as a result, a bearing portion of the motor may be heated. When the motor is in a stopped state and a thermistor, serving as a temperature detector 21, detects that the bearing temperature is less than or equal to a predetermined temperture, a central processing unit (CPU) 52 issues a command for heating. The command for heating is input to three OR gates 50 positioned on the output side of the motor driver IC 51. D.C. currents are thereby passed through the corresponding stator driving coils 5 via transistors 53. When three-layer coils are, for example, used, the OR gates 50 may be operated so as to pass currents through the three-layer stator driving coils 5. However, if D.C. currents continue to pass through the stator driving coils 5, the temperture of the stator driving coils 5 rapidly increases due to the D.C. currrents and have values which are different from the value detected by the thermistor 21 beacause of a delay in heat conduction. Accordingly, the command for heating from the CPU 52 is issued in the form of pulses, and hence the temperture of the stator driving coils 5 gradually increases. The width and duty of the pulses may be set to a most desirable value in accordance with the specifications of the stator driving coils 5. When the motor stops, by thus passing current through the stator driving coils 5 with an appropriate timing, it is possible to prevent a decrease in the temperature of the bearing. Furthermore, in order to effectively transmit the heat of the driving coils 5 to the bearing sleeve 14 or the rotating sleeve 41, the stator driving coils 5 may be supported by a material having an excellent heat conduction, the inner side of which may contact the bearing sleeve 14 or may be close to the rotating sleeve 41. In the present embodiment, since the OR gates 50 are operated so that the rotating shaft or the rotating sleeve does not rotate even if currents are passed through the stator driving coils 5 when the motor stops, the electric power of the current supply is not converted into kinetic energy, but all the electric power is converted into thermal energy. Accordingly, in the present embodiment, effective heating can be performed by a small amount of electric power. It is within the scope of the present invention to adopt a method in which the motor is not completely stopped, and a large amount of current may be passed at a low number of rotations of the rotor by controlling the operation of each OR gate 50.

Figure 5:
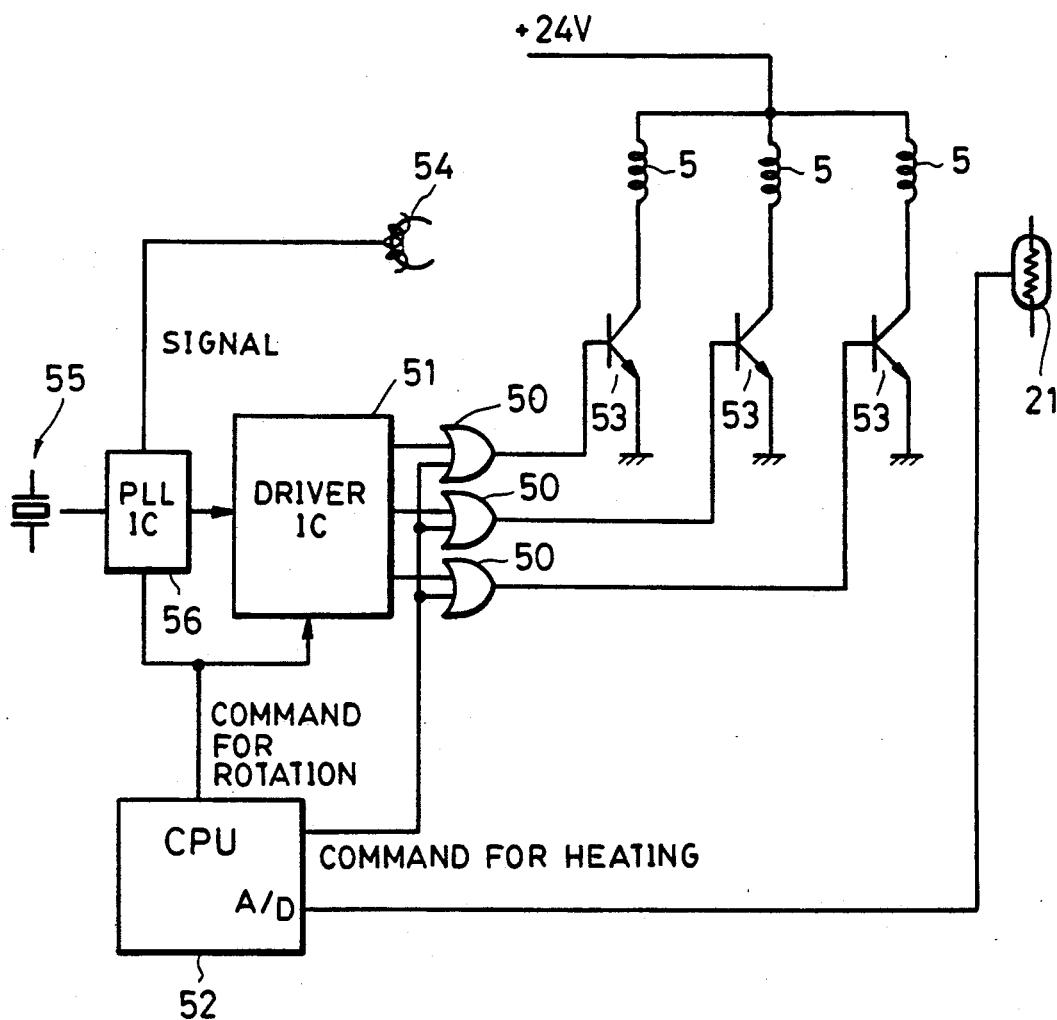
FIG. 5 is a cross-sectional view of a motor device according to still a further embodiment of the present invention.
Figure 6:
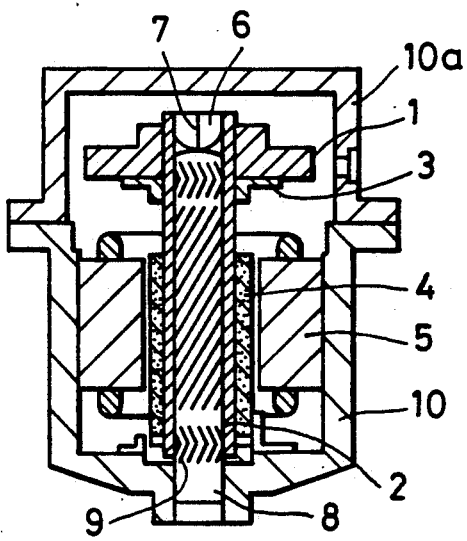
FIG. 6 is a cross-sectional view of a conventional deflection scanning motor.

In FIG. 5, a coil 54 generates a pulse-like signal relating to the rotation speed of the rotor 2 in cooperation with a magnet 12 provided at the rotor 2. A crystal 55 generates a clock pulse signal having a predetermined period. A phase locked loop integrated circuit (PLL-IC) 56 compares the signal with the clock pulse signal, controls a driving signal supplied to the driver IC 51, and determines the rotation speed of the rotor 2. The PLL-IC 56 and the driver IC 51 start their operation in accordance with a command for rotation form the CPU 52.

Although an explanation has been provided of the dynamic-pressure fluid bearings using oil as a fluid in all the above-described embodiments, the present invention may also be applied to deflection scanning motors having dynamic-pressure fluid bearings in which fluids other than oil are used and in which the viscosity of the fluids changes with changes in temperaure.

As described above, according to the deflection scanning motor according to the present invention, by the function of a heating means or a control means for supplying current for a driving coil, it is possible to hear a fluid in a dynamic-pressure fluid bearing, and to always maintain the viscosity of the fluid to be low. Hence, high-speed rotation becomes possible, and it is possible to prevent abnormal heating and uneven revolution of the motor itself.

The individual components illustrated in FIG. 5 are well known in the motor art and their specific construction and operation is not critical to the operation or best mode for carrying out the invention.

What is claimed is:

1. A motor device carrying a rotating mirror, comprising:
    said rotating mirror for reflecting a light beam emitted from a light source;
    a first support member for supporting said rotating mirror;
    a second support member for rotatably supporting said first support member;
    a fluid disposed between said first support member and said second support member;
    a rotor fixed to said first support member;
    a driving magnet provided on said rotor;
    a driving coil fixed at a position on a body portion of said motor device facing said driving magnet; and
    a heating member for heating said fluid, wherein said heating member heats said fluid before the rotation of said first support member is started by a driving force generated by said driving magnet and said driving coil.

2. A motor device according to claim 1, wherein said fluid is oil, and said oil supports said first support member relative to said second support member during relative rotation of said first support member and said second support member.

3. A motor device according to claim 1, further comprising a temperature detector for outputting a detection signal in accordance with a detected temperature, and wherein said heating member heats said fluid in accordance with the detection signal.

4. A motor device according to claim 3, further comprising a substrate for supporting said heating member, said temperature detector, and said driving coil.

5. A motor device comprising:
    a first support member;
    a second support member for rotatably supporting said first support member;
    a fluid disposed between said first support member and said second support member;
    a rotor fixed to said first support member;
    a driving magnet provided on said rotor;
    a driving coil fixed at a position on a body portion of said motor device facing said driving magnet; and
    control means for controlling the temperature of said fluid by changing a supply of current to said driving 6. A motor device according to claim 5, wherein said control means includes a temperature detector for outputting a detection signal in accordance with a detected temperature, and wherein said control means controls the supply of current to said driving coil according to the detection signal.

7. A motor device comprising:
    a first support member;
    a second support member for rotatably supporting said first support member;
    a fluid disposed between said first support member and said second support member;
    a rotor fixed to said first support member;
    a driving magnet provided on said rotor;
    a driving coil fixed at a position on a body portion of said motor device facing said driving magnet; and
    control means for controlling the supply of current to said driving coil in order to heat said fluid, when said rotor is stationary.

* * * * *